United States Patent
Fattelay

[15] 3,667,571

[45] June 6, 1972

[54] SOUND-INSULATING DEVICE FOR NOISY APPARATUS

[72] Inventor: Robert Fattelay, 21 B rue Nicolas Bruand, 25 Besancon, France

[22] Filed: May 17, 1971

[21] Appl. No.: 143,900

[30] Foreign Application Priority Data

Nov. 6, 1970 France....................................7040095

[52] U.S. Cl..............................181/36 A, 181/33 K, 181/53
[51] Int. Cl............................................................F01n 1/08
[58] Field of Search...................181/36 R, 36 A, 33 R, 33 K, 181/53, 33 A

[56] References Cited

UNITED STATES PATENTS 2,136,315  11/1938  Pettit....................................181/36 A
3,332,504  7/1967  Lowery................................181/36 A

FOREIGN PATENTS OR APPLICATIONS 496,454  11/1938  Great Britain........................181/36 A
835,713  5/1960  Great Britain........................181/36 A Primary Examiner—Robert S. Ward, Jr.
Attorney—Steinberg & Blake

[57] ABSTRACT

Sound-insulating device for apparatus generating intensive noise comprising a series of $n$ impervious enclosures of increasing dimensions, the first enclosure having the smallest dimensions enclosing completely and directly the said apparatus, the second enclosure surrounding at least partially the first enclosure and so on, the means for securing the apparatus to the first enclosure and the means for securing the enclosures to one another being constituted by vibration-damping members.

11 Claims, 1 Drawing Figure

PATENTED JUN 6 1972 3,667,571
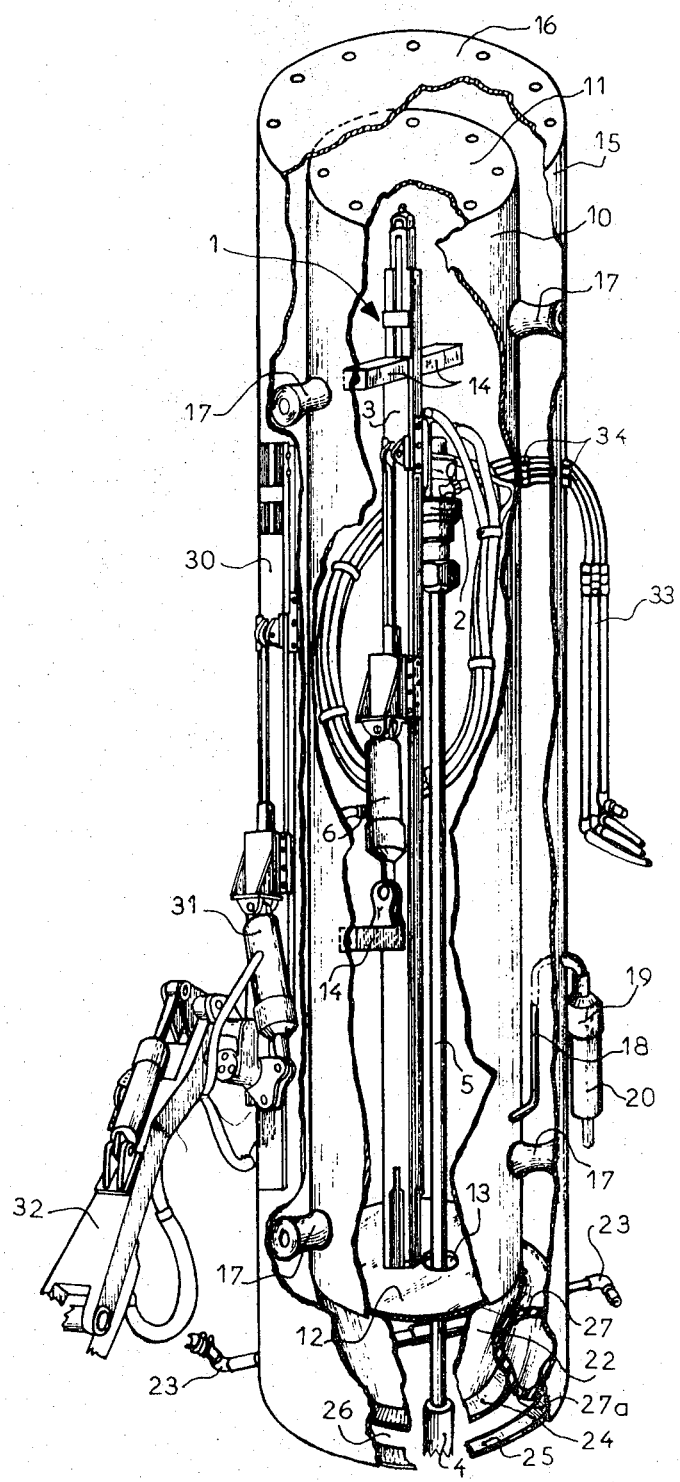
INVENTOR
ROBERT FATTELAY
By Stemberg & Blake
attorneys

SOUND-INSULATING DEVICE FOR NOISY APPARATUS

The present invention has essentially for its object a sound-insulating device for apparatus which generate intensive noise, especially public-works machines operating on air, such as drilling machines, hammer drills, etc.

Among the nuisances of phonic origin affecting modern life, especially city life, one of the most important is due to machines of the aforementioned type which generate both compressed-air exhaust noise and noise of mechanical origin caused by the operation of tools which percuss or perforate the ground. Such noise has an extremely harmful effect on man and should therefore be prevented or at least reduced to a minimum.

The present invention is directed essentially at preventing such noise and has for its object a sound-insulating device characterized in that it comprises a series of $n$ impervious enclosures of increasing dimensions, the first enclosure, having the smallest dimensions, enclosing directly the apparatus concerned, the second enclosure surrounding at least partially the first enclosure, and so on, the means for fastening the apparatus to the first enclosure and the means for fastening the enclosures to one another being constituted by vibration damping members.

Thus, the device according to the invention allows to prevent or at least considerably reduce air-exhaust noise, owing to the fact that the apparatus is completely enclosed therein, so that the said exhaust takes place within the enclosures constituting the said device. It also allows to reduce or at least diminish the transmission of mechanical vibrations, owing to the use of vibration damping members for connecting the apparatus with the first enclosure and connecting the enclosures with one another.

According to another feature of the invention, the first enclosure communicates with the ambient air through the medium of an air-pressure reducer.

Such a member while enabling the air necessary for the operation of the apparatus to be discharged into the ambient air performs the said discharge under a pressure close to atmospheric pressure, i.e., with practically no noise.

According to one form of embodiment of the invention, the first enclosure communicates with the second enclosure which communicates with the following enclosure and so on, the last enclosure communicating with the ambient air through the medium of an air-pressure reducer.

The compressed air expands in the various successive enclosures before escaping to the atmosphere through the medium of the air-pressure reducer.

According to another feature of the invention, the device comprises two coaxial cylindrical enclosure, the inner enclosure enclosing the apparatus and the outer enclosure surrounding partially the inner enclosure, the means for fastening the apparatus to the inner enclosure and the means for fastening the inner enclosure to the outer enclosure being constituted by vibration damping blocks of resilient material.

According to another feature of the invention, the outer cylindrical enclosure extends downwardly beyond the bottom wall of the inner cylindrical enclosure, the latter ending downwardly with an end-piece in the shape of a truncated cone and sealing means being provided between the said end-piece and the lower portion of the said outer enclosure.

Again according to the invention, the said end-piece and outer enclosure are provided at their lower ends with separate flanges or soles, the said sealing means being constituted by a resilient O-ring seal projecting between the said flanges or soles and resting directly upon the ground.

The said resilient O-ring seal ensures a certain imperviousness between the lower portion of the device and the more or less irregular ground, so that it muffles the noise caused by the operation of the drill or the like.

The invention is also directed at apparatus generating intensive noise, especially public-works machines operating on compressed air, provided with a sound-insulating device of the aforementioned type.

Other features and advantages of the invention will appear as the following description proceeds.

The appended drawing given only as a non-limitiative example is a perspective view, partially broken away, of a device according to the invention used for sound-insulation of a perforating-hammer drilling apparatus.

According to the form of embodiment illustrated, the drilling apparatus indicated generally by the reference digit 1 is constituted by a compressed-air perforating hammer 2 mounted on a guide 3, the said hammer driving a bit 4 through the medium of a drilling rod 5. The perforating hammer 2 is driven in translation along the guide 3 and in parallel relationship to the drilling rod 5 by means of an actuator 6.

The assembly constituted by the guide 3 and the hammer 2 is enclosed within a first enclosure 10 having the shape of a circular-section cylinder and made from any material, metal, plastics, etc. The cylinder 10 is sealingly closed at its top by a cover 11 provided for instance with a seal (not shown) and at its bottom by a cover 12 provided with an orifice 13 through which the rod 5 passes. The guide 3 is secured to the cylinder 10 by means of vibration damping blocks 14 made from a resilient material such as rubber or the like.

The cylinder 10 is itself enclosed within an enclosure constituted by a second cylinder 15 which also is circular in section but whose diameter and height are considerably superior to those of cylinder 15. The cylinder 15 is made from any material, metal, plastics or the like and is sealingly closed at its top by a cover 16. Both cylinders 10 and 15 are arranged in coaxial relationship to one another through the medium of vibration damping blocks 17 which are made, like the blocks 14, from a resilient material such as rubber, the said blocks being arranged radially in the space between the said cylinders.

Vents or the like, such as 18, interconnect the internal space of cylinder 10 with the internal space of cylinder 15. The internal space of cylinder 15 also communicates with the ambient air through the medium of air-pressure reducers such as 19 and discharge members such as 20.

The cylinder 10 ends at its bottom with an end-piece 22 in the shape of a truncated cone forming at the bottom of the device a dust exhaust chamber, the said end-piece being traversed by a vacuum dust-exhauster 23 and provided at its bottom with an annular flange or sole 24 resting upon the ground. The outer cylinder 15 is also provided at its bottom with an annular flange or sole 25 extending concentrically with respect to the flange 24 and also resting upon the ground, both flanges 24 and 25 being separated from one another by an empty annular space 26. Between the end-piece 22 and the lowest portion of the cylinder 15 is arranged a flexible O-ring seal constituted for instance by a rubber air-chamber or the like 27 which, owing to the compression exerted on its flanks between the outer cylinder and the said end-piece, passes partially through the interval 26, thus forming at the bottom of the device a sort of excrescence 27a which is in contact with the ground and sealingly closes the outer cylinder 15 at its bottom. Owing to the flexibility of the rubber air-chamber 27, the excrescence 27a takes the shape of the ground on which is placed the drilling apparatus, thus preventing the noise produced by the drilling bit and rod from being transmitted outside.

The device is mounted on a guide 30 along which it is adapted to slide under the action of an actuator 31, the said guide being hingedly mounted at the end of a bracket 32 carried by a truck (not shown) moving on rails in two directions of a horizontal plane.

The supply of compressed air to the drilling device is ensured by flexible tubes 33, the said tubes passing through the walls of the cylinders 10 and 15 through the medium of flexible end-pieces 34 made from a resilient material such as rubber.

When the device is being operated and is resting upon the ground through the medium of its flanges or soles 24 and 25, the excrescence 27a of the air chamber 27 also being in contact with the ground and taking the shape of its irregularities so as to isolate the drill from the exterior, the compressed air escaping from the hammer 2 expands within the cylinder 10 and then passes through the outlets or vents 18 into the cylinder 15 from which it is discharged to the atmosphere through the air-pressure reducers 18 and the discharge members 19. The air is discharged to the atmosphere under a pressure close to atmospheric pressure, therefore the discharge takes place practically without noise.

Mechanical vibrations are absorbed by the dampers 14 and 17, so that the outer cylinder 15 is subjected to practically no vibration.

The vibrations and noise caused by the operation of the bit or the like 4 are damped by the excrescence 27a of the O-ring seal 27 which ensures a certain imperviousness between the lowest portion of the device and the ground.

The device according to the invention therefore enables to prevent or at least considerably reduce the noise caused by the exhaust of compressed air as well as noise of mechanical origin.

Instead of being filled with air as in the example described, the space comprised between the cylinders 10 and 15 may be filled, in case a more efficient sound insulation is desired, with a liquid or solid substance absorbing the vibrations, for instance with water, oil, expanded polystyrene or the like. In this case, the compressed air expanded within the cylinder 10 cannot be discharged into the cylinder 15 as in the form of embodiment described above, and it must be discharged directly to the atmosphere through the medium of an air-pressure reducer and a discharge or outlet member. In this case, it is sufficient to connect the outlets or vents 18 directly with the discharge members 20 as shown in dash-and-dot lines on the drawing.

It is obvious that the cylindrical shape of the enclosures 10 and 15 is more particularly suitable for a drilling apparatus such as illustrated in the appended drawing, and that for a public-works machine of a different type the enclosures surrounding the machine may be given a completely different shape. This shape may for instance be parallelepipedic or spherical, and the enclosures may be used in any suitable number higher than two.

Of course, the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. Sound-insulating device for apparatus generating intensive noise, such as drilling machines and hammer drills operating on compressed air and provided with a drilling rod, comprising a series of $n$ impervious enclosures of increasing dimensions, the first enclosure having the smallest dimensions enclosing completely and directly the said apparatus, the second enclosure surrounding at least partially said first enclosure and so on, first vibration-damping members for securing said apparatus to said first enclosure and further vibration-damping members for securing said enclosures to one another.

2. Device according to claim 1, wherein said first enclosure is provided with air-pressure reducing means by which it communicates with the atmosphere.

3. Device according to claim 1, wherein each one of said enclosures is provided with vent means by which it communicates with the following enclosure, the last enclosure being provided with air-pressure reducer means by which it communicates with the atmosphere.

4. Sound-insulating device for apparatus generating intensive noise, such as drilling machines and hammer drills operating on compressed air and provided with a drilling rod comprising an inner cylindrical enclosure having a bottom wall and enclosing said apparatus, an outer cylindrical enclosure surrounding partially said inner enclosure, first damping blocks made from resilient material for securing said apparatus to said inner cylindrical enclosure and second damping blocks made from resilient material for securing said inner cylindrical enclosure to said outer cylindrical enclosure.

5. Device according to claim 4, wherein said outer cylindrical enclosure surrounds said inner cylindrical enclosure except the said bottom wall thereof, the latter being traversed by said drilling rod.

6. Device according to claim 5, wherein said outer enclosure extends downwardly beyond said bottom wall, said inner cylindrical enclosure, being prolonged, also downwardly, by an end-piece in the shape of a truncated cone, sealing means being provided between the said end-piece and the said outer cylindrical enclosure.

7. Device according to claim 6, wherein said end-piece in the shape of a truncated cone and the said outer cylindrical enclosure are provided at their lower ends with separate flanges, the said sealing means being constituted by a flexible O-ring seal placed between the said end-piece and the said outer enclosure, the said seal projecting between said flanges.

8. Device according to claim 7, wherein said seal is constituted by an air-chamber made from rubber.

9. Device according to claim 4, wherein said inner enclosure is provided with vent means by which it communicates with said outer enclosure, the latter being provided with air-pressure reducing means by which it communicates with the atmosphere.

10. Device according to claim 4, wherein a substance capable of absorbing vibrations and sounds, is provided between said inner enclosure and said outer enclosure.

11. Device according to claim 4, wherein a bracket is provided for hingedly supporting said device.

* * * * *